April 15, 1924.
S. L. STONE ET AL
1,490,142
GRIP PAD FOR STEERING WHEEL RIMS
Filed Oct. 26, 1922
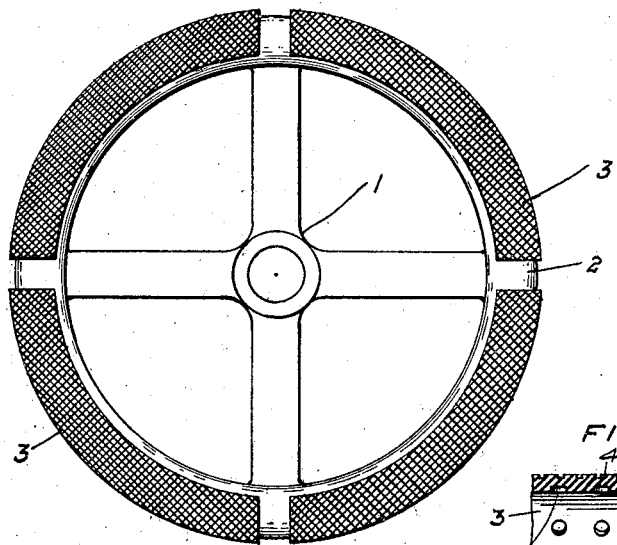
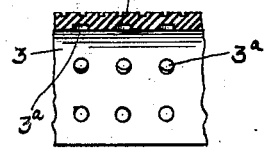
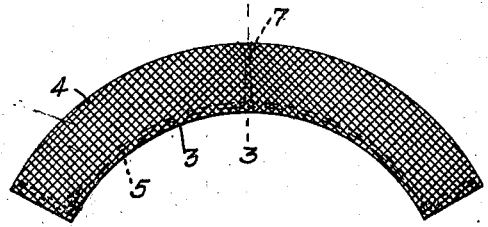
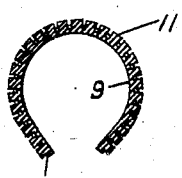
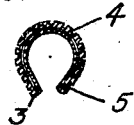
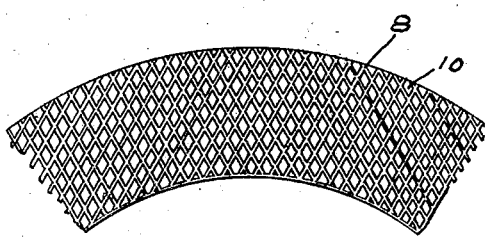
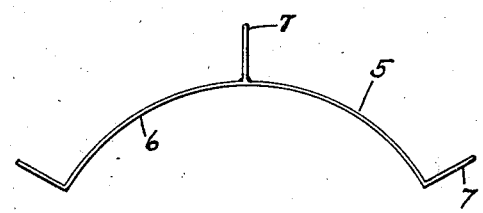
INVENTOR
SELDEN L. STONE
HUGH B. POWELL
BY
ATTORNEY Patented Apr. 15, 1924.

1,490,142

UNITED STATES PATENT OFFICE.

SELDEN L. STONE AND HUGH B. POWELL, OF INDIANAPOLIS, INDIANA.

GRIP PAD FOR STEERING-WHEEL RIMS.

Application filed October 26, 1922. Serial No. 597,152.

*To all whom it may concern:*

Be it known that we, SELDEN L. STONE and HUGH B. POWELL, citizens of the United States, residing at Indianapolis, in the county of Marion and State of Indiana, have invented certain new and useful Improvements in Grip Pads for Steering-Wheel Rims, of which the following is a specification.

This invention relates to grip pads for steering wheel rims and the prime feature of the invention is the provision of one or more pads which when applied to the rim of a steering wheel of an automobile or similar vehicle will prevent slippage of the hands when the steering wheel is being operated, the exterior of the pad having a more or less roughened outer surface.

And a further feature of the invention is the provision of means for frictionally clamping the pads to the rim of the steering wheel whereby the pad may be easily removed or applied to use.

Other objects and advantages will be hereinafter more fully set forth and pointed out in the accompanying specification.

In the accompanying drawings,

Figure 1 is a plan view of a steering wheel showing the grip pads applied thereto, Figure 2 is a side elevation of one of the grip pads removed from the steering wheel, Figure 3 is a sectional view as seen on line 3—3, Figure 2, Figure 4 is an elevation of one form of clamp, for frictionally holding the pad in engagement with the rim of the steering wheel, Figure 5 is a detail sectional view showing the inner face of the pad, Figure 6 is a transverse sectional view on an enlarged scale of a slightly different form of pad and clamping means, and Figure 7 is a detail elevation of the form of clamping means shown in Figure 6 removed from the pad proper.

Referring to the drawings, 1 indicates a steering wheel of any conventional type having a rim 2 which may be grasped by the hands of the operator for guiding the vehicle and to prevent slippage of the hands on the rim when the steering wheel is being operated, one or more pads 3 are attached to the rim, preferably four in number, the outer peripheries of the pads having projections 4 which form a roughened gripping surface so that it will be practically impossible for the hands to slip when the pads are properly gripped.

In order to reinforce the pads, as they are preferably constructed of rubber or fabric, a clamping frame 5 is preferably embedded within the fabric composing the pad, each clamping member comprising arms 6 which extend longitudinally of the pad and adjacent the free edges thereof, said arms being connected by loop sections 7 which may be in any prescribed number, but as shown, one at each end of the arms and one at the central portion thereof. The pads proper and the clamping frames 5 are so constructed that it will be necessary to separate the free edges of the pads in order to introduce them over the sections of the wheel rim and by forming the clamping frames of spring metal they will securely hold the pads in engagement with the rim under ordinary circumstances, but by applying proper pressure thereon may be readily disengaged from the rim.

As shown in Figure 5 of the drawings, the inner wall of the pad 3 is preferably provided with a plurality of pockets or cups $3^a$ which, when the pad is engaged with the rim, will create a suction or vacuum and aid in retaining the pad in fixed position on the rim.

As shown in Figures 6 and 7 of the drawings, a different form of clamping frame may be provided and in this instance the frame 8 is placed exteriorly of the pad 9 and the frame has a plurality of perforations 10 through which the projections 11 on the exterior of the pads extend, the spring tension of the frame in this instance serving to hold the pad in engagement with the rim of the wheel in a manner similar to the form of frame shown in Figure 4. The form of frame shown in Figures 6 and 7 is to be used principally with higher grade cars, and in order to properly impart a fanciful and pleasing effect to the pads, the portions of the frame between the projections of the pad may be nickeled or otherwise treated to give any desired color effect.

This form of device can be very cheaply manufactured and readily attached to or removed from the rim of the steering wheel and owing to the roughened condition of the gripping face of the pads and the rigidity with which they are held in engagement with the rim of the steering wheel it will be practically impossible for the hands of the operator to slip when the steering wheel is being manipulated.

Having thus fully described our said invention, what we claim as new and desire to secure by Letters Patent, is:

1. The combination with the rim of a steering wheel, of one or more grip pads having roughened outer surfaces, and a clamping frame embedded in each pad adapted to frictionally hold the pad in engagement with said rim.

2. The combination with the rim of a steering wheel, of a grip pad, means for clamping the pad on the rim, and suction forming means for causing said pad to adhere to said rim.

3. The combination with the rim of a steering wheel, of a pad having an exterior surface formed with a plurality of projections and a perforated clamp engaging the pad said projections extending through the perforations of said clamp, substantially as set forth.

4. The combination with the rim of a steering wheel, of a grip pad a resilient clamp therefor extending longitudinally along the pad for causing frictional engagement of the pad with the rim, substantially as set forth.

5. The combination with the rim of a steering wheel, of a grip pad having suction forming means for causing said pad to adhere to the rim, substantially as set forth.

6. The combination with the rim of a steering wheel of a longitudinally arcuate grip pad and a resilient arcuate clamp therefor extending longitudinally along the pad, substantially as set forth.

7. A grip pad for steering wheels formed longitudinally arcuate and a resilient clamp therefor embedded within the pad and extending longitudinally thereof, substantially as set forth.

8. A grip pad for steering wheels formed arcuate in cross section the ends of said arcuate portion being spaced apart, and a resilient arcuate clamp therefor extending longitudinally along the pad, substantially as set forth.

In witness whereof, we have hereunto set our hands and seals at Indianapolis, Indiana, this 17th day of October, A. D. nineteen hundred and twenty-two.

SELDEN L. STONE. [L. S.]
HUGH B. POWELL. [L. S.]

Witnesses:
M. L. SHULER,
CAREY S. FRYE.